United States Patent

Griffin, Sr.

[11] Patent Number: 6,041,681
[45] Date of Patent: Mar. 28, 2000

[54] LUG WRENCH STABILIZER

[76] Inventor: Edwin Griffin, Sr., 1220 N. Broad St., Apt. 1504, Philadelphia, Pa. 19121

[21] Appl. No.: 09/028,549

[22] Filed: Feb. 24, 1998

Related U.S. Application Data

[63] Continuation-in-part of application No. 08/662,927, Jun. 13, 1996, abandoned.

[51] Int. Cl.$^7$ ...................................................... B25B 23/00
[52] U.S. Cl. ............................. 81/462; 248/407; 81/180.1
[58] Field of Search ............................ 81/52, 180.1, 462; 248/161, 407, 157, 423, 172, 440.1

[56] References Cited

U.S. PATENT DOCUMENTS

| | | |
|---|---|---|
| 1,592,354 | 7/1926 | Gaffers ................................. 248/407 X |
| 1,988,037 | 1/1935 | Furrer ....................................... 248/407 |
| 3,097,550 | 7/1963 | Johnston .................................... 81/462 |
| 3,730,027 | 5/1973 | Rohn ......................................... 81/462 |
| 3,832,917 | 9/1974 | Feith . |
| 4,619,161 | 10/1986 | Reynolds . |
| 4,620,462 | 11/1986 | Parker . |
| 4,625,600 | 12/1986 | Koren et al. . |
| 4,660,447 | 4/1987 | Rossi . |
| 4,829,856 | 5/1989 | Reynolds . |
| 4,972,742 | 11/1990 | Brown . |
| 5,018,413 | 5/1991 | Vasquez . |
| 5,263,392 | 11/1993 | Schoen . |
| 5,431,074 | 7/1995 | Durante . |

FOREIGN PATENT DOCUMENTS 2517934  11/1976  Germany ................................. 81/462

*Primary Examiner*—James G. Smith
*Attorney, Agent, or Firm*—Evans & Burrell; Susan B. Evans

[57] ABSTRACT

Disclosed herein is a lug wrench stabilizer for use in safely and conveniently removing and replacing a vehicle wheel normally secured to the vehicle by a plurality of securely tightened lug nuts. The invention provides an "A" frame which is formed by a right and left tubular member and a horizontal support bar connected to and positioned between the right and left tubular members at a predetermined height below the apex. Each of said tubular members comprise a telescoping leg within a housing which is supportably connected to a standing pad and a standing pad swivel means to support the assembled device on uneven terrain. Each of the telescoping legs has a plurality of notches situated across the width of the telescoping legs that can be aligned for receiving a bail. The bail itself is hinged and spring loaded on the "A" frame assembly to adjust the working height of the invention by locking the amount of extension of the telescoping legs, each telescoping leg is fitted with a stop mechanism on the end opposite of the standing pad. The stop mechanism prevents separation of the telescoping legs from the tubular members in even the most heightened position. The "A" frame is the support for two cylindrical fulcrums, one at the apex and one atop the horizontal support bar. The cylindrical fulcrums provide a safety mechanism so that when a lug wrench is placed therein to remove lug nuts, the lug wrench is unable to slip.

16 Claims, 3 Drawing Sheets

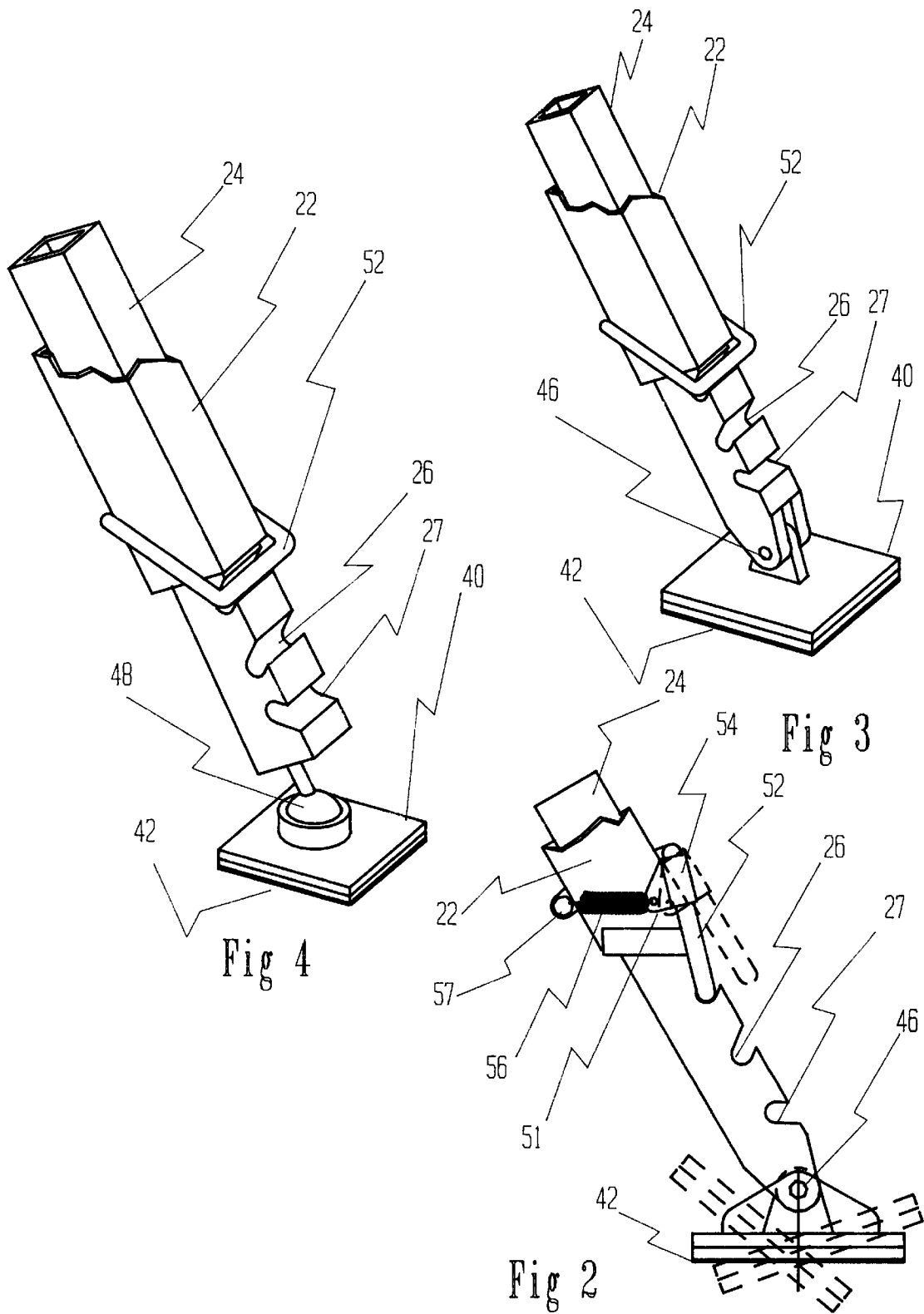

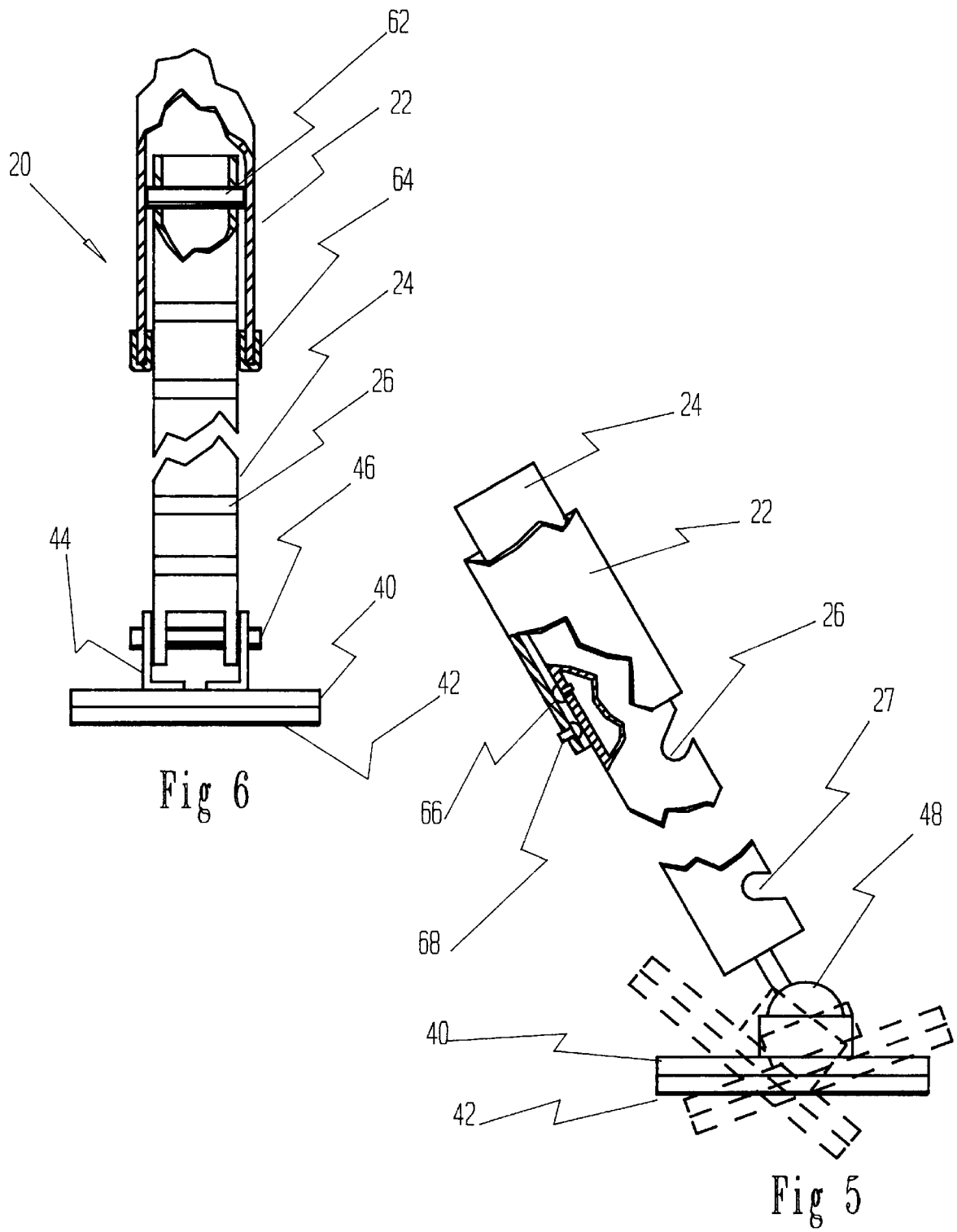

LUG WRENCH STABILIZER

The present invention is a continuation-in-part of application U.S. Ser. No. 08/662,927 filed Jun. 13, 1996, now abandoned. It relates to a portable lug wrench stabilizer for use in removing lug nuts from the wheel of a vehicle.

BACKGROUND

In today's society lug nuts are generally installed so tightly by pneumatic tools or over zealous service persons that ordinary civilians particularly women and the elderly have difficulty in removing flat tires.

The present invention provides a practical, safe and efficient way of removing overly tightened lug nuts or at least providing a convenient mechanism for having such services provided once a car is disabled. The present invention also has a number of safety devices which make it a very desirable tool to have on the road as well as being user friendly. One such advantage exists as a result of the cylindrical fulcrums which are an integral part of the present invention. Any of a variety of lug nut wrenches when in use is positioned through one of the cylindrical fulcrums of the present invention. Thus the cylindrical fulcrums create both a support for the wrench and a guard preventing the wrench from slipping or being propelled into the air as the wrench is being utilized either by hand or by foot.

The present invention helps to reduce back injuries which are prevalent when one loosens lug nuts by conventional means, when the lug nuts are over torqued.

A further advantage of the present invention is the standing pad pivot means which creates a leveling device for the tubular members and further stabilizes the lug wrench stabilizer which may be safely used on uneven terrain. This advantage is further enhanced by the use of rubber pads on the bottom of the standing pads so that the device does not move or slip when pressure is applied on uneven ground.

U.S. Pat. No. 5,263,392 discloses a hand operated rotatable tool for assisting in the loosening and removal of lug nuts from vehicle wheels. The device is composed of a triangular base that is adjustable with a cradle for supporting the wheel removal tool. U.S. Pat. No. 4,625,600 similarly to the "392 patent" discloses a lug removal/installation device that has a triangularly shaped base. However, rather than adjusting the base, this device described in the "392 patent" merely chooses the correct cradle for removing the lug nut.

U.S. Pat. No. 5,020,413 discloses a tool support for removing and installing lug nuts from the wheel of a vehicle. This device is composed of a vertical housing with a plurality of generally cylindrical receiving chambers therein that is supported by a base.

None of this prior art discloses the instant invention.

SUMMARY OF THE INVENTION

The present invention provides an improved device for use in conjunction with a lug type wrench in the removal or installation of vehicle wheel lugs comprising:

an "An" frame having a right and left tubular member and a horizontal support bar connected to the right and left tubular members at a predetermined height with each of said right and left tubular members comprising a telescoping leg within a housing where the housing for each of the tubular members is joined at one end to form an apex and where the telescoping leg of each of the right and left tubular members has a free end portion which is supportably connected to a standing pad, and the telescoping leg of each of the right and left tubular members having a plurality of notches situated across the width of said telescoping legs that can be aligned for receiving a bail;

a bail suitably attached to the outside of the housing which bail releasably fastens the housing into the aligned notches in the telescoping legs at an adjustable height; and an upper and a lower cylindrical fulcrum, the upper cylindrical fulcrum supported by the "A" frame at the apex and the lower cylindrical fulcrum enclosed between the right and left tubular members of the "A" frame at a predetermined distance from the upper cylindrical fulcrum and positioned atop the horizontal support bar, both cylindrical fulcrums being suitably positioned for supporting a rotatable tool.

The device of the present invention in a preferred embodiment for use in conjunction with a lug type wrench in the removal or installation of vehicle wheel lugs comprising:

an "A" frame having a right and left tubular member and a horizontal support bar connected to the right and left tubular members at a predetermined height with each of said tubular members comprising a telescoping leg within a housing where the housing for each of the tubular members is joined at one end to form an apex and where the telescoping leg of each of the first and the second tubular members has a free end portion which is supportably connected to a cradle swivel foot, comprising a cradle and a pivot pin positioned atop a standing pad with a rubber pad on the bottom thereof, and the telescoping legs of each of the right and left tubular members having a plurality of notches situated across the width of said telescoping legs that can be aligned for receiving a bail;

a bail suitably attached to the outside of the housing by a tubular bail hinge which bail releasably fastens the housing into the aligned notches in the telescoping legs at an adjustable height which bail is secured in said telescoping leg notch by a right and left bail clip on each side of the bail and held in place by a bail spring attached to the right and left bail clips; and an upper and a lower cylindrical fulcrum, the upper cylindrical fulcrum supported by the "A" frame at the apex and the lower cylindrical fulcrum enclosed between the right and left tubular members of the "A" frame at a predetermined distance from the upper cylindrical fulcrum and positioned atop the horizontal support bar, both cylindrical fulcrums being suitably positioned for supporting a rotatable tool.

BRIEF DESCRIPTION OF THE DRAWINGS

These as well as other features of the present invention will become more apparent upon reference to the drawings wherein:

FIG. 2 is a side view of a tubular member section showing the tubular member being adjusted at a height and showing the swivel versatility of the cradle swivel foot standing pad pivot means.

FIG. 3 is a side view of a tubular member section showing the tubular member being adjusted at a height and showing a single posted swivel foot standing pad pivot means.

FIG. 4 is a side view of a tubular member section showing the tubular member being adjusted at a height and showing a ball jointed swivel foot standing pad pivot means.

FIG. 5 is a cut away view of a tubular member showing the telescoping leg nipples and corresponding housing nipples which prevent separation of the device once assembled.

FIG. 6 is a cut away view of a tubular member showing the telescoping leg stop pin and corresponding housing stops which prevent separation of the device once assembled.

DETAILED DESCRIPTION OF THE INVENTION

Figure 1:
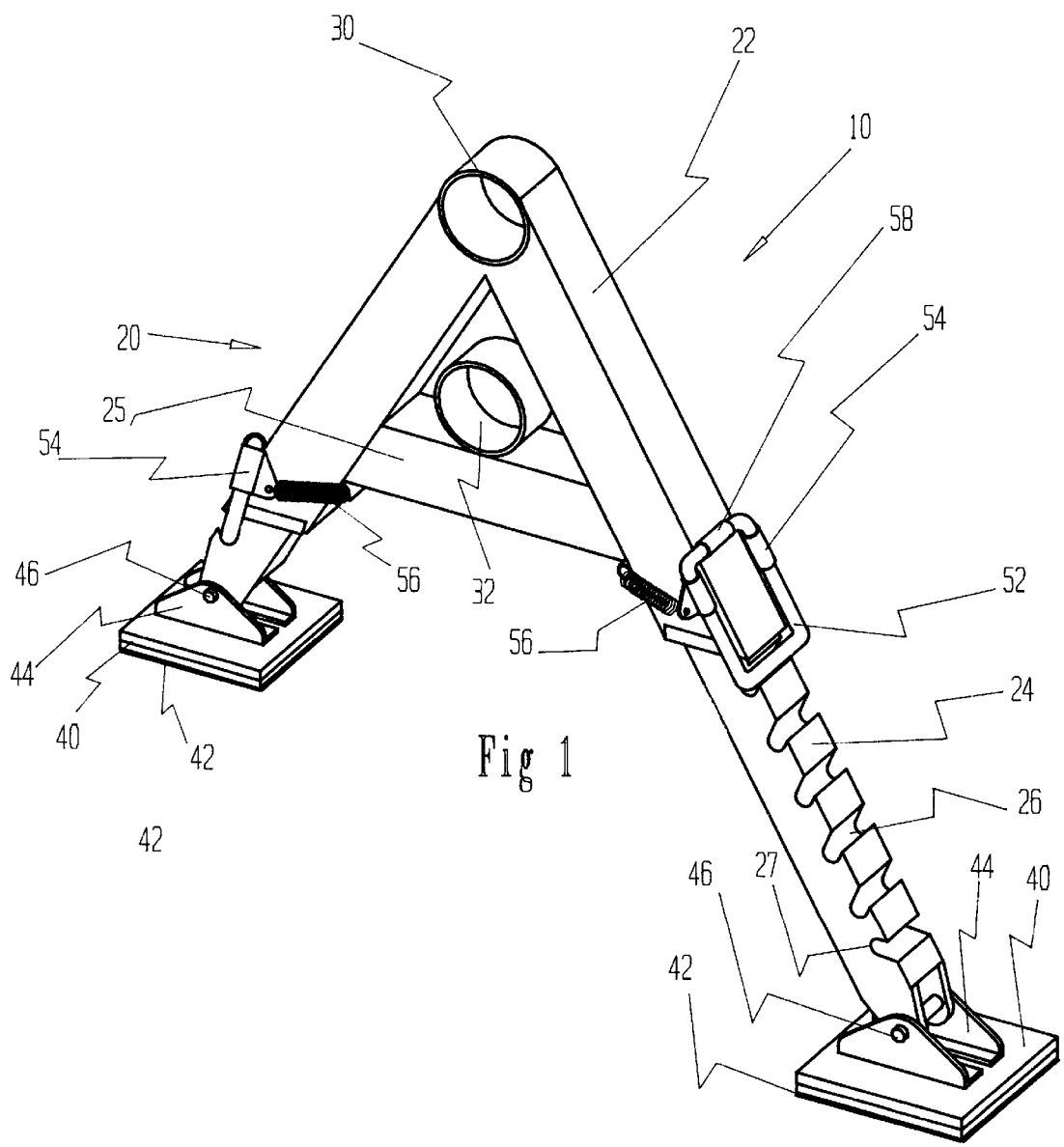
FIG. 1 is a front perspective view of the lug wrench stabilizer of the present invention.

Referring to the drawings, FIGS. 1–6 illustrate a lug nut tool stabilizer referred to by the general reference character 10.

FIG. 1 illustrates the lug wrench stabilizer of the present invention. The lug wrench stabilizer 10 has an "A" frame having right and left tubular members 20 and a horizontal support bar 25 suitably connected to and positioned between the right and left tubular members 20 at a predetermined height which is preferably substantially proximate to the end of the housing 22 opposite the apex. Each of said tubular members 20 comprise a telescoping leg 24 within a housing 22 where the housing 22 for each of the tubular members is joined at one end to form an apex and where the telescoping leg 24 of said tubular members 20 have a free end portion which is supportably connected to a standing pad 40. The housing 22 and telescoping leg 24 of each of the right and left tubular members 20 has a plurality of notches 26 situated across the width of said telescoping legs 24 that can be aligned for the receiving of a bail 52.

FIG. 1 also illustrates an upper and a lower cylindrical fulcrum 30, 32 the upper cylindrical fulcrum 30 supported by the "A" frame at the apex and the lower cylindrical fulcrum 32 enclosed between the right and left tubular members 20 of the "A" frame at a predetermined distance from the upper cylindrical fulcrum 30 and positioned atop the horizontal support bar 25, both upper and lower cylindrical fulcrums 30, 32 being suitably positioned for supporting a rotatable tool.

FIGS. 1–4 the bail 52 which is suitably attached to the housing 22 releasably fastens into the notches 26 on the telescoping legs 22 thus serving as a height adjustment means, fastening the housing 22 into said telescoping legs 24 at an adjustable height suitable for removing the lug nuts. The bail 52 is attached to the housing 22 by any of the myriad of attachment means known in the art, preferably by an attachment means selected from the group consisting of metal strap and tubular bail hinge 58, preferably a tubular bail hinge 58. The bail 52 may be attached to the housing 22 in a front position on an exterior wall as in FIGS. 1 and 2 or in a rear position on an interior wall as in FIGS. 3 and 4.

FIG. 2 illustrates a preferred embodiment of the bail 52 wherein the bail 52 is secured in each telescoping leg 24 notch 26 by a right and left bail clip 54 on each side of the bail 52 and held in place by a bail spring 56 attached to both the right and left bail clips 54. This assembly is known in the art and is referred to herein as a spring loaded bail. The bail spring 56 is attached to the housing 22 by an attachment device preferably a tubular spring holder 57 as illustrated in FIG. 2. The bail clip 54 is used to further secure the bail 52 into notch 26 thus further sturdying the lug wrench stabilizer of the present invention.

FIGS. 1–5 further illustrate the device 10 of the present invention in a locked position wherein the bail 52, preferably a spring loaded bail, releasably fastens a special notch, referred to as a storage notch 27, positioned in the telescoping leg 24 together with the corresponding housing 22 in a stored position so that when in the stored position the housing 22 covers the telescoping leg 24 in substantial entirety. The storage notch 27 is positioned in the telescoping leg 24 as the notch most proximate to the standing pad 40. The storage notch 27 is positioned to engage the bail 52 and securely lock the device 10 together, preventing the bail 52 from being easily dislodged, thus creating a safe storage or carrying mode.

FIG. 3 is a perspective view of the standing pad 40 and standing pad pivot means. The standing pad pivot means serves as a leveler to the contour of the ground for the standing pads 40 which provides support for and are secured to the free ends of the telescoping legs 20 of the "A" frame and further stabilize the lug wrench stabilizer 10 which may be safely used on uneven terrain. FIGS. 1–6 illustrate the use of a nonslip pad, preferably a rubber pad 42 on the bottom of the standing pad 40 so that the device does not move or slip when pressure is applied on uneven ground. The standing pad pivot means is selected from the group consisting of a cradle swivel foot FIGS. 2 & 6, a ball jointed swivel foot FIGS. 4 & 5, and a single posted swivel foot FIG. 3, preferably a ball jointed swivel foot and a cradle swivel foot, more preferably a cradle swivel foot. The cradle swivel foot is comprised of a cradle 44 which is positioned atop the standing pad 40 and a pivot pin 46 which connects the cradle 44 to the telescoping leg 24 and allows the standing pad 40 to swivel. The ball jointed swivel foot is comprised of a ball joint 48 positioned in a base. The base is positioned atop and is attached to the standing pad 40. The single posted swivel foot is comprised of a vertical attachment plate one end of which is positioned in the center of and is an integral part of the standing pad 40 the other end attaches to the telescoping leg 24 by means of a pivot pin 46.

FIGS. 5 and 6 illustrate a stop mechanism 62, 64, 66, 68 suitably positioned within the right and left tubular members 20 to prevent telescoping leg 24 and housing 22 respectively from inadvertently dislodging one from the other when the device 10 is extended to its most heightened position. The stop mechanism is selected from the group consisting of a telescoping leg stop pin 62 and corresponding housing stops 64 and telescoping leg nipples 66 and corresponding housing nipples 68, preferably a telescoping leg stop pin 62 and corresponding housing stops 64. The stop mechanism acts as a safety device preventing the separation of telescoping leg from the housing in even the most heightened position Changes and modifications in the specifically described embodiments can be carried out without departing from the scope of the invention which is intended to be limited only by the scope of the appended claims.

What is claimed is:

1. A device for use in conjunction with a lug type wrench in the removal or installation of vehicle wheel lugs comprising:

an "A" frame having a right and left tubular member and a horizontal support bar connected to the right and left tubular members at a predetermined height with each of said right and left tubular members comprising a telescoping leg within a housing where the housing for each of the tubular members is joined at one end to form an apex and where the telescoping leg of each of the right and left tubular members has a free end portion which is supportably connected to a standing pad, and the telescoping leg of each of the right and left tubular members having a plurality of notches situated across the width of each of said telescoping legs which notches that correspond on the telescoping legs can be aligned with each other for receiving a bail;

said bail suitably attached to the outside of the housing which bail releasably fastens the housing into the aligned notches in the telescoping legs at an adjustable height; and an upper and a lower cylindrical fulcrum, the upper cylindrical fulcrum supported by the "A" frame at the apex and the lower cylindrical fulcrum enclosed between the right and left tubular members of the "A" frame at a predetermined distance from the upper cylindrical fulcrum and positioned atop the horizontal support bar, both cylindrical fulcrums being suitably positioned for supporting a rotatable tool.

2. A device according to claim 1 further including a stop mechanism is suitably positioned within the right and left tubular members to prevent said telescoping legs and said housings respectively from inadvertently dislodging one from the other when the device is extended to its most heightened position.

3. A device according to claim 2 wherein the stop mechanism is a telescoping leg stop pin and corresponding housing stops.

4. A device according to claim 2 wherein the stop mechanism is telescoping leg nipples and corresponding housing nipples.

5. A device according to claim 1 wherein the bail is attached to an exterior wall of the housing by a tubular bail hinge.

6. A device according to claim 1 additionally comprising a standing pad pivot means connected to said standing pad which acts as a leveler to the contour of the ground for said standing pad which provides support for and is secured to the free ends of the telescoping legs of the "A" frame.

7. A device according to claim 6 wherein the standing pad has rubber pads on the bottom thereof.

8. A device according to claim 7 wherein the standing pad pivot means is a cradle swivel foot.

9. A device according to claim 7 wherein the standing pad pivot means is a ball jointed swivel foot.

10. A device according to claim 1 wherein the bail is secured in each telescoping leg notch by a right and left bail clip attached to each side of the bail and held in place by a bail spring attached to both the right and left bail clips.

11. A device according to claim 10 wherein the bail spring is attached to the housing by a tubular spring holder.

12. A device according to claim 1 wherein said bail releasably fastens a storage notch positioned in the telescoping leg together with the corresponding housing creating a stored position so that when in the stored position the housing covers the telescoping leg in substantial entirety.

13. A device for use in conjunction with a lug type wrench in the removal or installation of vehicle wheel lugs comprising:

an "A" frame having a right and left tubular member and a horizontal support bar connected to the right and left tubular members at a predetermined height with each of said tubular members comprising a telescoping leg within a housing where the housing for each of the tubular members is joined at one end to form an apex and where the telescoping leg of each of the first and the second tubular members has a free end portion which is supportably connected to a cradle swivel foot, comprising a cradle and a pivot pin positioned atop a standing pad with a rubber pad on the bottom thereof, and the telescoping legs of each of the right and left tubular members having a plurality of notches situated across the width of each of said telescoping legs which notches that correspond on the telescoping legs can be aligned with each other for receiving a bail;

said bail suitably attached to the outside of the housing by a tubular bail hinge which bail releasably fastens the housing into the aligned notches in the telescoping legs at an adjustable height which bail is secured in said telescoping leg notch by a right and left bail clip on each side of the bail and held in place by a bail spring attached to the right and left bail clips; and an upper and a lower cylindrical fulcrum, the upper cylindrical fulcrum supported by the "A" frame at the apex and the lower cylindrical fulcrum enclosed between the right and left tubular members of the "A" frame at a predetermined distance from the upper cylindrical fulcrum and positioned atop the horizontal support bar, both cylindrical fulcrums being suitably positioned for supporting a rotatable tool.

14. A device according to claim 13 further including a stop mechanism suitably positioned within the right and left tubular members to prevent said telescoping legs and said housings respectively from inadvertently dislodging one from the other when the device is extended to the most heightened position.

15. A device according to claim 14 wherein the stop mechanism is a telescoping leg stop pin and corresponding housing stops.

16. A device according to claim 14 wherein a spring loaded bail locks the telescoping leg and housing together in a stored position so that when in the stored position the housing covers the telescoping leg in substantial entirety.

* * * * *